United States Patent [19]

Chen et al.

[11] Patent Number: 4,652,623
[45] Date of Patent: Mar. 24, 1987

[54] POLYMERS FOR USE AS FILTRATION CONTROL AIDS IN DRILLING MUDS

[75] Inventors: Shih-Ruey T. Chen, Coraopolis, Pa.; Christine A. Costello, Amherst; Gary F. Matz, Revere, both of Mass.

[73] Assignee: Calgon Corporation, Pittsburgh, Pa.

[21] Appl. No.: 674,215

[22] Filed: Nov. 23, 1984

[51] Int. Cl.$^4$ .................... C08F 228/02; C08F 226/04
[52] U.S. Cl. ..................................... 526/287; 252/8.51
[58] Field of Search .......................................... 526/287

[56] References Cited

U.S. PATENT DOCUMENTS

| | | | |
|---|---|---|---|
| 4,147,681 | 4/1979 | Lim | 526/287 |
| 4,293,427 | 9/1981 | Lucas . | |
| 4,305,860 | 12/1981 | Iovine | 526/287 |
| 4,455,240 | 1/1984 | Costello . | |
| 4,536,292 | 8/1985 | Matz | 210/701 |

Primary Examiner—Christopher Henderson
Attorney, Agent, or Firm—W. C. Mitchell; R. B. Olson; M. C. Sudol, Jr.

[57] ABSTRACT

The instant invention is directed to a polymer, having an intrinsic viscosity of 1.0 to 7.0, preferably 1.5 to 5.0, dl/g in 1.0M NaCl, prepared from:

(A) 2.5 to 45%, by weight, of at least one unsaturated carboxylic acid, or its salt;
(B) 5.0 to 85%, by weight, of at least one unsaturated sulfonic acid, or its salt;
(C) 2.5 to 15%, by weight, of at least one unsaturated cationic-containing monomer; and
(D) 0 to 90%, by weight, of at least one unsaturated non-ionic monomer.

The instant invention is also directed to the polymer in combination with an aqueous clay dispersion and the use of the admixture as a filtration aid in drilling muds.

3 Claims, No Drawings

POLYMERS FOR USE AS FILTRATION CONTROL AIDS IN DRILLING MUDS

BACKGROUND OF THE INVENTION

It is well known that in perforating earthen formations to tap subterranean deposits such as gas or oil, that perforation is accomplished by well drilling tools and a drilling fluid. The drilling fluid serves to cool and lubricate the drill bits, to carry the cuttings to the surface as the drilling fluid is circulated in and out of the well, to support at least part of the weight of the drill pipe and drill bit, to provide a hydrostatic pressure head to prevent caving of the walls of the well bore, to deposit on the surface of the well bore a filter cake which acts as a thin, semi-impervious layer to prevent undue passage therethrough of fluids, and to perform other functions as are well known in the drilling art. It is important that the drilling fluid exhibit a relatively low rate of filtration or fluid loss in addition to having desirable rheological properties such as viscosity and gel strength. It is also important that the drilling fluid system should be kept as simple and inexpensive as possible in order to avoid undue expense in the drilling of the well.

Drilling fluid also has an effect on the friction between the drill pipe and the bore hole, and the higher the coefficient of friction between the drill pipe and the formation being drilled, that is, the lower the degree of lubricity of the drilling fluid, the greater the power requirements needed to rotate the drill pipe in the bore hole filled with the drilling fluid. Further in this respect, a drilling fluid having a low degree of lubricity or a high coefficient of friction between the drill pipe and the uncased well bore means that a high degree of drag on the drill pipe results, thereby lessening the useful life of the drill pipe. Therefore, the lubricating properties of the drilling fluid are assuming an increased importance to those skilled in the art, not only with regard to the wearing of the bearings in the drill bit, but also with respect to the friction between the drill pipe and the uncased bore hole.

Drilling an oil or gas well is generally conducted by a rotary system. This system depends upon the rotation of a string of drill pipe to the bottom of which is attached a multi-pronged drilling bit. The bit cuts into the earth causing the cuttings to accumulate as drilling continues. As a result, a drilling fluid must be used to carry these cuttings to the surface for removal, thus allowing the bit to continue functioning and the bottom hole to be kept clean and free of cuttings at all times. Drilling systems other than the rotary system are sometimes used, but these also require a drilling fluid to remove the bore hole cuttings and to perform functions related to drilling fluids.

Oil-producing formations are generally porous layers having varying degrees of permeability to the flow of fluids such as oil, water or gas. Consequently, the rate of oil production is largely determined by the rate of flow through these permeable formations which, in turn, is dependent upon the porosity or permeability of the sand or stone present. In drilling through such a porous layer, it is desirable to employ a drilling fluid having such characteristics that excessive amounts of liquids or solids are prevented from penetrating through the porous formation. The ability of the drilling fluid to prevent excessive formation fluid penetration is called filtration control.

Besides the filtration control, an acceptable polymer has to maintain an adequate rheology (flow) properties of drilling fluids. Gary and Darley, ed., *Composition and Properties of Oil Well Drilling Fluids*, 4th ed., page 12, states: "The flow properties of the drilling fluid play a vital role in the success of the drilling operation. These properties are primarily responsible for removal of the drill cuttings, but influence drilling progress in many other ways. Unsatisfactory performance can lead to such serious problems as bridging the hole, filling the bottom of the hole with drill cuttings, reduced penetration rate, hole enlargement, stuck pipe, loss of circulation, and even a blowout."

Materials that have been used in the past to control filtration rates of aqueous drilling fluids by plugging, producing cakes or similar methods, have included materials such as pregelatinized starch, sodium carboxylmethylcellulose (CMC), sodium polyacrylates and lignites. Each of these materials have certain limitations. For example, lignite becomes ineffective in high salt concentrations. Thermodegradation of CMC is accelerated as the temperature approaches 300° F.

Acrylic and methacrylic derivatives, such as those which are copolymerized with hydrocarbon substituted styrenes, such as alpha methyl styrene, para methyl styrene, 2,4-dimethyl styrene and the like have been utilized in drilling fluids. For example, U.S. Pat. No. 2,718,497 teaches the use of relatively high molecular weight polymers of these materials to control water loss characteristics of aqueous muds and clay dispersions. Additionally, U.S. Pat. No. 2,650,905 teaches the use of water soluble sulfonated polystyrene derivatives for filtration control in water-based drilling fluids.

Acrylic acid derivatives such as copolymers of acrylamide and sodium acrylate derivatives have been frequently used commercially as flocculants for drilling fluids, and are disclosed in U.S. Pat. Nos. 3,558,545 and 3,472,325. Similarly, a copolymer derived from acrylic acid and acrylamide is disclosed in U.S. Pat. No. 3,323,603 as a flocculant for aqueous drilling fluids. However, the use of polyacrylate for filtration control in some areas has been limited by its sensitivity to calcium ions.

U.S. Pat. No. 4,293,427 discloses a copolymer additive prepared from (1) a (meth)acrylamido alkyl sulfonic acid or alkali metal salt thereof and (2) a (meth)acrylamide or N-alkyl (meth)-acrylamide. The copolymer may be cross-linked with a quaternary ammonium salt.

DESCRIPTION OF THE INVENTION

The instant invention is directed to a polymer, having an intrinsic viscosity of 1.0 to 7.0, preferably 1.5 to 5.0, dl/g in 1.0M NaCl, prepared from:

(A) 2.5 to 45%, preferably 25 to 35%, by weight, of at least one unsaturated carboxylic acid, or its salt;

(B) 5.0 to 85%, preferably 25 to 40%, by weight, of at least one unsaturated sulfonic acid, or its salt;

(C) 2.5 to 15%, preferably 5 to 10%, by weight, of at least one unsaturated cationic-containing monomer; and (D) 0 to 90%, preferably 15 to 45% by weight, of one or more unsaturated nonionic monomer.

The instant invention is also directed to an aqueous drilling fluid, comprising:

(a) an aqueous clay dispersion; and (b) the above-described polymer.

The instant invention is also directed to a method for drilling a well in a subterranean formation comprising circulating into the well, during drilling an aqueous drilling fluid, the improvement wherein said aqueous drilling fluid comprises:

(a) an aqueous clay dispersion; and
(b) the above-described polymer.

The clay dispersion may be any finely divided solid which is capable of being dispersed or suspended in an aqueous liquid vehicle. Ordinarily, such material will include hydratable clay or colloidal clay bodies such as Wyoming bentonite, commercial medium-yield drilling clays mined in various parts of the country such as in Texas, Tennessee and Louisiana, and those produced when clay subsurface formations are drilled. Weighting materials added to increase specific gravity such as barites, iron oxide, and the like may also be included.

The aqueous medium may be fresh water such as is obtained from wells or streams; it may be salt water from the sea or from wells; or, it may even include oil-in-water emulsions, i.e., water which has become contaminated in some way with small quantities of oil, or to which such oil has been added to gain some desired advantage. The polymers of the instant invention were found to be particularly effective in salt water and to be stable at high temperature. The drilling mud containing the polymers of the instant invention showed both good filtration and rheology properties.

It is contemplated that the drilling muds of the invention may also contain other additives besides the polymers of the invention. Materials such as caustic, quebracho, lime and the like may be added to the drilling mud at the surface while other materials such as gypsum, shale and the like may be encountered in subsurface formations during drilling operations.

When employed in accordance with the invention, the polymer may be added directly to the drilling mud as a dry powder, as a slurry suspended in a suitable liquid, or as a solution in water or some other suitable solvent, and they may be incorporated therein at any convenient point in the mud circulation system. It may be desirable to employ a mixing device such as a cone and jet mixer or the equivalent for incorporating the additive in the mud.

Any unsaturated carboxylic acid or its salt, may be used in preparing the polymer. Examples include acrylic acid, methacrylic acid, vinyl acetic acid, allyl acetic acid, 4-methyl-4-pentenoic acid, $\alpha$-haloacrylic acid, maleic acid, itaconic acid, fumaric acid, $\beta$-hydroxyethylacrylate, $\beta$-carboxyethyl acrylate, their salts and mixtures thereof. The preferred carboxylic functional monomers are acrylic acid, methacrylic acid, $\beta$-carboxyethylacrylate and their salts.

Any unsaturated sulfonic acid, or its salt, may be used. Examples include 2-acrylamido-2-methyl propyl sulfonic acid (AMPS), 2-methacrylamido-2-methyl propyl sulfonic acid (MAMPS), styrene sulfonic acid (SSA), vinyl sulfonic acid (VSA), sulfoalkylacrylates or methacrylates, allyl sulfonic acid (ASA), methallyl sulfonic acid (MASA), 3-methacrylamido-2-hydroxypropyl sulfonic acid, their salts and mixtures thereof. The preferred sulfonic compounds are AMPS, MAMPS, ASA, MASA, SSA, VSA and their salts.

Any unsaturated cationic-containing compound may be used. Specific examples of the most preferred cationic-containing monomers include quaternary ammonium compounds, such as diethyldiallyl ammonium chloride (DEDAAC) dimethyldiallyl ammonium chloride (DMDAAC), methacryloyloxy ethyl trimethyl ammonium methylsulfate (METAMS), methacrylamido propyl trimethyl ammonium chloride (MAPTAC), acryloyloxyethyl trimethyl ammonium chloride (AETAC), methacryloyloxyethyl trimethyl ammonium chloride (METAC), acrylamidomethylpropyl trimethyl ammonium chloride (AMPTAC), acrylamido methyl butyl trimethyl ammonium chloride (AMBTAC) and mixtures thereof. The preferred cationic-containing monomers are DMDAAC, DEDAAC and METAC.

The polymer may also be prepared by polymerizing a monomer containing a tertiary amine as the pendant group with subsequent quaternization of the nitrogen in the polymer to form the cationic mer units. Likewise, sulfur and phosphorus-containing monomers may be exhaustively methylated to form cations.

Any non-ionic monomer may optionally be used. Examples include: acrylamide, and its derivatives, such as methacrylamide, and N,N-dimethyl acrylamide. The preferred non-ionic monomer is acrylamide. Mixtures of non-ionic monomers may be used in preparing the polymer.

The quantity of the polymer to be employed in the drilling mud of the invention will vary with circumstances over a reasonably wide range and the amount employed in a specific suspension or dispersion will depend on these circumstances and the characteristics of the drilling fluid treated. Any quantity which reduces the water loss may be used. Ordinarily, satisfactory results with regard to water loss reduction will be obtained with quantities ranging between one and four pounds per 42-gallon barrel of drilling mud. For optimum reduction in filtration rate with certain drilling muds, however, quantities up to 6 pounds per 42-gallon barrel may be required. On the other hand, in some cases where, for example, only small improvement in filtration rate is desired, as little as 0.125 pound of the additive per barrel of mud will produce the desired effect. The exact amount to be added, as previously pointed out, depends upon the original character of the mud and on the properties desired. This can be determined, as is customary in the field by simple tests at the time the addition is made.

The polymers may be prepared by mixing the monomers preferably in the presence of a free radical initiator. Any free radical initiator may be used. Examples include peroxides, azo initiators and redox systems. The polymerization may also be initiated photochemically. The preferred catalysts are a mixture of persulfate, bisulfite and any azo type initiator, such as 2,2'-azobis-(2-amidinopropane)hydrochloride.

The polymer may be made by any of a variety of procedures, for example, in solution, suspension, bulk and emulsions.

The temperature is not critical. The reaction will generally occur between 10° and 100° C. The reaction, depending on the temperature, generally takes from 1 to 12 hours. Measuring for residual monomer will verify when the reaction is complete.

The pH of the reaction mixture is not critical The pH is generally in the range of 4.5 to 9.0.

The percent solids in the reaction mixture is not critical. The preferred range is 1 to 50%, by weight, solids.

The molecular weight of polymers are difficult to accurately measure. The polymers are, instead, usually identified by intrinsic viscosity. The intrinsic viscosity of the polyampholyte is not critical in the instant invention. The preferred intrinsic viscosity to 1.0 to 7.0 dl/g, most preferably 1.5 to 5.0 dl/g.

The rheology properties were measured by a direct-reading Fann V-G meter.

The following measurements are generally used for evaluation:

(a) Plastic viscosity (PV)=Reading at 600 rpm—Reading at 300 rpm (cps)

Plastic viscosity is the part of flow resistance caused by mechanical friction.

(b) Yield Point (YP)=Reading at 300 rpm - PV (lb/100 sq. ft.). Yield Point, the second component of resistance to flow in a drilling fluid, is a measurement of the electro-chemical or attractive forces in a mud.

(c) Gel strength (GELS)=Reading at 3 rpm initially/Reading at 3 rpm after 10 minutes GELS is a measure of the attractive forces between mud solids under static conditions. Lower gel values indicate lower pump pressure required to break circulation.

(d) The filtration property was measured by a standard API fluid loss (FL) test (FL=30-minute fluid loss from filter press at 100 psi of $N_2$).

The above testing procedures are outlined in the American Petroleum Institute Bulletin, "The Rheology of Oil Well Drilling Fluids", #13D, Section 5.3 and "Standard Procedure for Field Testing Drilling Fluids", #13B, Section 2.5.

Mud Compositions

A. Sea Salt Mud 15 g of bentonite in 250 ml of distilled water, 17.5 g of a simulated sea salt (Sea Rite) in 100 ml of distilled water, 20 g of Rev-dust, 2.0 g of polymer were sequentially added with mixing. The plastic viscosity (PV), yield point (YP), gel strength (GELS) and fluid loss (FL) were measured. The results are summarized in Table II.

B. 5% KCl Mud

Bentonite was prehydrated by adding 10 g of bentonite to 250 ml of distilled water and mixed for 10 minutes. 18 g of KCl dissolved in 100 ml of distilled water, and 2.0 g of polymer were sequentially added with mixing. The PV, YP, GELs and FL were measured. The results are summarized in Table II.

C. Calcium sulfate (gyp) Mud 14 g of bentonite in 350 ml distilled water, 20 g of Rev-dust, 4 g of gypsum and 1.0 of polymer were sequentially added with mixing. The PV, YP, GELs and FL were measured. The results are summarized in Table II.

EXAMPLES 1-11

The polymers of the Examples were produced by mixing the monomers indicated in Table I, in the amounts, initiator, temperatures (initial and peak) and times indicated.

For comparison examples:

Example A: A 67/33 weight ratio AM/AMPS copolymer, prepared according to U.S. Pat. No. 4,293,427, Example 1. No acrylate and cationic units in the polymer.

Example B: A 67/33 weight ratio AM/AMPS copolymer with 1.48 weight percent METAMS crosslinker, prepared according to U.S. Pat. No. 4,293,427, Example 1. No acrylate unit in the polymer.

Example C: A 47/43/10 weight ratio AA/AM/DMDAAC terpolymer. No AMPS in the polymer.

Example D: A commercial carboxylmethyl cellulose type polymer (Drispac Superlo).

TABLE I

| | REACTION CONDITIONS | | | | | | | | | | |
|---|---|---|---|---|---|---|---|---|---|---|---|
| | Polymers %, by Weight* | | | | | INITIATOR | | | | $t_i$ | $t_p$ | $T_{Total}$ |
| Example | $AA^a$ | $AMPS^b$ | $AM^c$ | $DMDAAC^d$ | $METAC^e$ | Type | Amount | Type | Amount | (°C.) | (°C.) | (Minutes) |
| 1 | 60 | 30 | — | 5 | 5 | $SPS^f$ | .16% | $SMBS^g$ | .04% | 22 | 87 | 47 |
| 2 | 30 | 30 | 35 | 5.0 | — | SPS | .32% | $SMBS^g$ | .16% | 14 | 80 | 27 |
| 3 | 35 | 25 | 35 | 5.0 | — | SPS | .32% | SMBS | .16% | 25 | 98 | 8 |
| 4 | 25 | 25 | 45 | 5.0 | — | SPS | .32% | SMBS | .16% | 24 | 98 | 8 |
| 5 | 25 | 35 | 35 | 5.0 | — | SPS | .32% | SMBS | .16% | 23 | 87 | 12 |
| 6 | 35 | 35 | 25 | 5.0 | — | SPS | .32% | SMBS | .16% | 24 | 87 | 11 |
| 7 | 30 | 30 | 30 | 10.0 | — | SPS | .16% | SMBS | .04% | 19 | 83 | 15 |
| 8 | 30 | 30 | 30 | 5.0 | 5.0 | SPS | .16% | SMBS | .04% | 22 | 84 | 31 |
| 9 | 30 | 30 | 30 | 5.0 | 5.0 | SPS V-50$^h$ | .16% .004% | SMBS | .04% | 21 | 83 | 38 |
| 10 | 30 | 30 | 30 | 5.0 | 5.0 | SPS V-50 | .16% .004% | SMBS | .04% | 21 | 85 | 40 |
| 11 | 30 | 30 | 30 | 5.0 | 5.0 | SPS V-50 | .16% .004% | SMBS | .04% | 19 | 77 | 35 |

*Polymer concentration = 28%
$^a$AA = acrylic acid
$^b$AMPS = 2-acrylamido-2-methyl propyl sulfonic acid
$^c$AM = acrylamide
$^d$DMDAAC = dimethyldialkyl ammonium chloride
$^e$METAC = methacryloyloxymethyl trimethyl ammonium chloride
$^f$SPS = sodium persulfate
$^g$SMBS = sodium metabisulfite
$^h$V-50 = 2,2'-azobis-(2-amidinopropane)hydrochloride

TABLE II

| | | PERFORMANCE DATA | | | | | | | | | | | |
|---|---|---|---|---|---|---|---|---|---|---|---|---|---|
| | Polymer | KCl | | | | SEA SALT | | | | GYP MUD | | | |
| EXAMPLE | [η] in 1.0M MaCl | PV | YP | GELS | FL | PV | YP | GELS | FL | PV | YP | GELS | FL |
| 1 | 2.6 | 5 | 1 | 1/1 | 10 | 5 | 9 | 4/7 | 13 | 4 | 13 | 10/10 | 39 |
| 2 | 2.0 | 4 | 1 | 1/1 | 12 | 5 | 2 | 1/1 | 10 | 6 | 1 | 1/1 | 12 |
| 3 | 2.2 | 5 | 0 | 1/1 | 10 | 6 | 0 | 1/1 | 7 | 4 | 1 | 1/1 | 10 |

TABLE II-continued

| | Polymer | PERFORMANCE DATA | | | | | | | | | | | |
|---|---|---|---|---|---|---|---|---|---|---|---|---|---|
| | | KCl | | | | SEA SALT | | | | GYP MUD | | | |
| EXAMPLE | [η] in 1.0M MaCl | PV | YP | GELS | FL | PV | YP | GELS | FL | PV | YP | GELS | FL |
| 4 | 2.2 | 5 | 2 | 1/1 | 9 | 6 | 1 | 1/2 | 7 | 5 | 1 | 1/1 | 9 |
| 5 | 2.1 | 5 | 1 | 1/1 | 11 | 6 | 0 | 1/1 | 7 | 4 | 1 | 1/1 | 11 |
| 6 | 1.9 | 5 | 0 | 1/1 | 14 | 7 | 1 | 1/1 | 9 | 5 | 0 | 1/1 | 14 |
| 7 | 4.1 | 5 | 4 | 1/1 | 8 | 8 | 3 | 2/2 | 8 | 6 | 8 | 7/7 | 29 |
| 8 | 3.8 | 7 | 2 | 1/1 | 9 | 9 | 1 | 1/1 | 6 | 5 | 11 | 10/10 | 21 |
| 9 | 4.3 | 8 | 2 | 1/1 | 9 | 9 | 2 | 1/1 | 7 | 6 | 9 | 7/8 | 16 |
| 10 | — | 8 | 4 | 1/1 | •9 | 9 | 2 | 2/3 | 6.5 | 6 | 7 | 3/7 | 16 |
| 11 | — | 8 | 3 | 1/1 | 9 | 8 | 3 | 1/2 | 5.5 | 5 | 6 | 2/3 | 14 |
| Comparitive A | | — | — | — | — | — | — | — | — | 10 | 25 | 15/15 | 10 |
| Comparative B | | — | — | — | — | — | — | — | — | 8 | 23 | 14/14 | 12 |
| Comparative C | | — | — | — | — | — | — | — | — | 5 | 11 | 11/11 | 65 |

EXAMPLE 12

This Example demonstrates the effectiveness of the polymer of the present invention as a filtration control agent at high temperature. The polymer of Example 9, was added to a modified gypsum mud with the following composition:

| | |
|---|---|
| Dl H₂O | 350 ml |
| Bentonite | 14 g |
| Rev-Dust | 30 g |
| Gypsum | 4 g |
| Caustic | 0.75 g |
| Lignosulfate | 3.0 g |
| Polymer Sample | 1.0 g |

Each sample was aged for 16 hours at a temperature of 325° F. and then cooled down. The rheological properties and API filtrate reading were taken. A commercial carboxylmethyl cellulose sample, as identified as comparative D, was also examined. The results of these tests are shown in Table III.

TABLE III

| Sample | Hot Aged | PV | YP | GELS | FL |
|---|---|---|---|---|---|
| Example 9 | No | 7 | 3 | 0/2 | 9.8 |
| Example 9 | 325° F., 16 hrs. | 4 | 1 | 0/1 | 19.8 |
| Comparative D | No | 8 | 2 | 0/4 | 9.4 |
| Comparative D | 325° F., 16 hrs. | 4 | 5 | 0.5/9 | 47.6 |
| Base Mud | No | 3 | 10 | 7/12 | 57.4 |
| Base Mud | 325° F., 16 hrs. | 6 | 9 | 4/14 | 56.6 |

What is claimed is:

1. A polymer, having an intrinsic viscosity of 1.0 to 7.0 dl/g in 1.0M NaCl, which consists essentially of:
    (A) 25 to 35%, by weight, of a least one unsaturated carboxylic acid selected from the group consisting of acrylic acid, methacrylic acid and their salts;
    (B) 25 to 40%, by weight, of at least one unsaturated sulfonic acid selected from the group consisting of 2-acrylamido-2-methyl propyl sulfonic acid, 2-methacrylacrylamido-2-methyl propyl sulfonic acid, and their salts;
    (C) 5 to 10%, by weight, of at least one unsaturated cationic-containing monomer selected from the group consisting of dimethyldiallyl ammonium chloride, diethyldiallyl ammonium chloride and methacryloyloxyethyl trimethyl ammonium chloride; and
    (D) 15 to 45%, by weight, of at least one unsaturated non-ionic monomer selected from the group consisting of acrylamide and methacrylamide.

2. The polymer of claim 1, having an intrinsic viscosity of 1.5 to 5.0 dl/g in 1.0M NaCl.

3. The polymer of claim 1, wherein said cationic-containing monomer is a monomer containing a pendant tertiary amine which was quaternized subsequent to polymerization.

* * * * *